US010042571B2

(12) United States Patent
Brannock et al.

(10) Patent No.: US 10,042,571 B2
(45) Date of Patent: Aug. 7, 2018

(54) TECHNIQUES TO PROVIDE RUN-TIME PROTECTIONS USING IMMUTABLE REGIONS OF MEMORY

(71) Applicant: INTEL CORPORATION, Santa Clara, CA (US)

(72) Inventors: Kirk D. Brannock, Hillsboro, OR (US); Barry E. Huntley, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 22 days.

(21) Appl. No.: 15/087,566

(22) Filed: Mar. 31, 2016

(65) Prior Publication Data

US 2017/0285987 A1 Oct. 5, 2017

(51) Int. Cl.
G06F 21/00 (2013.01)
G06F 3/06 (2006.01)
G06F 9/30 (2018.01)
G06F 21/55 (2013.01)

(52) U.S. Cl.
CPC .......... *G06F 3/0622* (2013.01); *G06F 3/0637* (2013.01); *G06F 3/0644* (2013.01); *G06F 3/0659* (2013.01); *G06F 3/0673* (2013.01); *G06F 9/3004* (2013.01); *G06F 21/554* (2013.01); *G06F 2221/034* (2013.01)

(58) Field of Classification Search
None
See application file for complete search history.

(56) References Cited

U.S. PATENT DOCUMENTS

| 8,997,210 | B1 * | 3/2015 | Kaplan | G06F 9/30145 710/305 |
| 2003/0061531 | A1 * | 3/2003 | Fletcher | G06F 9/4401 714/6.32 |
| 2003/0217250 | A1 * | 11/2003 | Bennett | G06F 9/468 712/224 |
| 2004/0243766 | A1 * | 12/2004 | Lovelace | G06F 12/0804 711/133 |
| 2007/0067590 | A1 * | 3/2007 | Savagaonkar | G06F 12/145 711/163 |
| 2008/0040565 | A1 * | 2/2008 | Rozas | G06F 12/145 711/163 |
| 2008/0162849 | A1 * | 7/2008 | Savagaonkar | G06F 12/145 711/163 |

* cited by examiner

*Primary Examiner* — Duc Doan

(57) ABSTRACT

Various embodiments are generally directed to an apparatus, method and other techniques for determining a region of the memory for which to store information, inserting the information into the region of the memory, and applying one or more characteristics to the region of the memory via an instruction set architecture (ISA) operation, the one or more characteristics comprising an immutable characteristic to prevent modification of the information in the region of the memory.

25 Claims, 9 Drawing Sheets

700

DETERMINE A REGION OF THE MEMORY IN WHICH TO STORE INFORMATION
705

INSERT THE INFORMATION INTO THE REGION OF THE MEMORY
710

APPLY ONE OR MORE CHARACTERISTICS TO THE REGION OF THE MEMORY VIA AN INSTRUCTION SET ARCHITECTURE (ISA) OPERATION, THE ONE OR MORE CHARACTERISTICS COMPRISING AN IMMUTABLE CHARACTERISTIC TO PREVENT MODIFICATION OF THE INFORMATION IN THE REGION OF THE MEMORY
715

*FIG. 7*

TECHNIQUES TO PROVIDE RUN-TIME PROTECTIONS USING IMMUTABLE REGIONS OF MEMORY

TECHNICAL FIELD

Embodiments described herein generally include applying one or more characteristics to secure a region of memory via hardware mechanisms.

BACKGROUND

A computer system typically includes a number of hardware components including a processor to process information and data. The processor may operate in a normal mode and a protected mode such as the system management mode (SMM). SMM allows system developers and operators to provide functions such as power management or security, in a manner that is transparent to the operating system (OS) and other application programs. However, vulnerabilities in privileged execution environments, such as SMM, can result in persistent code injection attacks and exploitation by malware writers with little or no indication to the computer system.

BRIEF DESCRIPTION OF THE DRAWINGS

FIG. 7 illustrates an example of a second logic flow.

DETAILED DESCRIPTION

Figure 1:
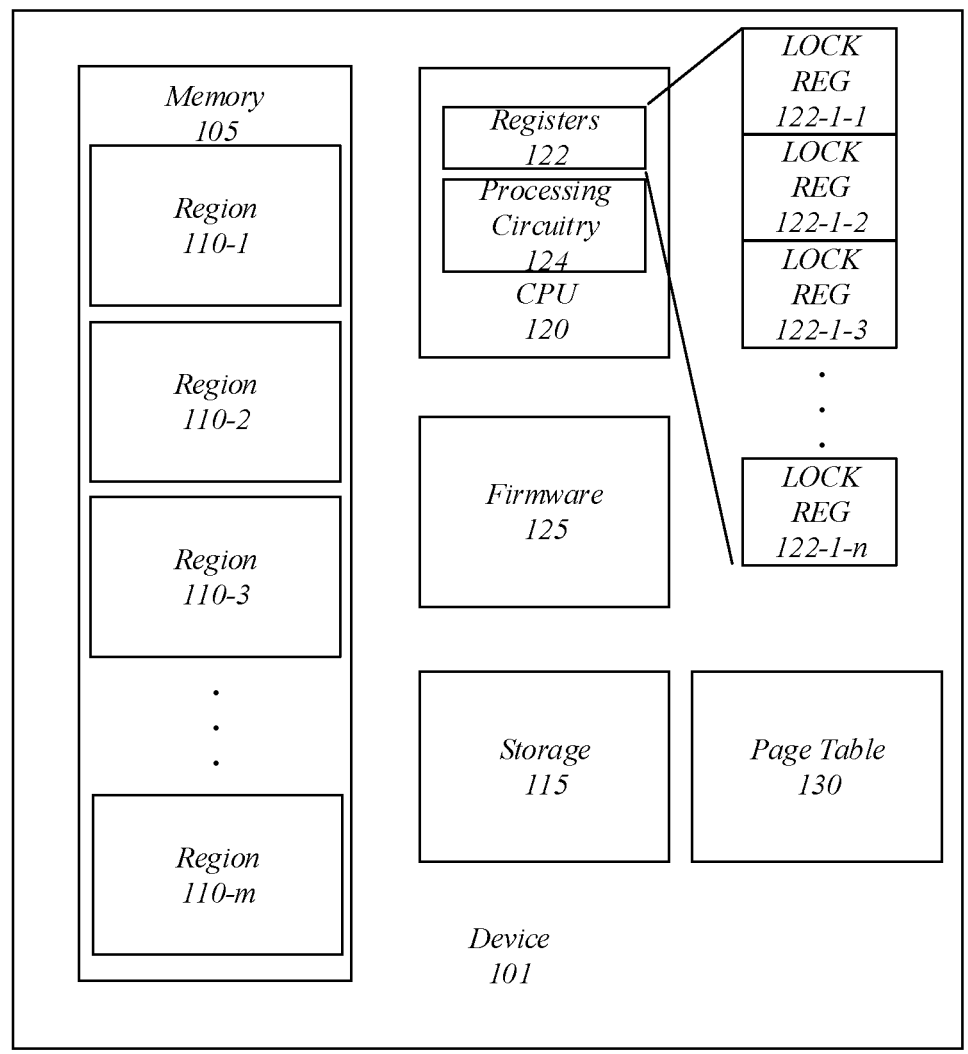
FIG. 1 illustrates an example embodiment of a device.

Various embodiments may be generally directed to preventing code injection attacks and modification of key data structures by creating one or more hardware enforced secure regions of memory having one or more characteristics to prevent changes to information, such as code, data, tables, other software operations, and so forth, from being exploited or corrupted. For example, one or more protected regions of memory may be generated and made immutable by activating hardware protection mechanisms, such as setting one or more bits in a register. The one or more regions may contain the most critical information, such as SMM code, SMM page tables, and the like. Protecting these regions with hardware mechanisms, as discussed herein, ensures that they cannot be modified maliciously (or accidentally) during runtime execution.

More specifically, embodiments may include firmware having one or more instructions that may be executed during a boot sequence of a computing device. In some instances, the firmware may include instructions to cause processing circuitry to configure the one or more regions in the memory during the boot sequence, cause information and data to be stored in the one or more regions, and apply one or more characteristics, such as immutability, to the one or more regions to create a more secure operating environment. These one or more characteristics may be applied by setting one or more bits in a register, for example. Embodiments are not limited in this manner and these and other details will become more apparent in the following description.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example embodiment of a system 100 in which aspects of the present disclosure may be employed. The system 100 may include a device 101 having a number of devices, systems, components, circuitry and infrastructure to provide one or more secure regions of memory to store information. In some embodiments, the device 101 may include memory 105 which may be divided into one or more regions 110-$m$, storage 115, a computing processing unit (CPU) 120 having registers 122-$n$ and processing circuitry 124, firmware 125, and page table(s) 130 which may include one or more pages.

In various embodiments, the device 101 may be embodied as any type of computing device, including a personal computing, a desktop computer, a tablet computer, a netbook computer, a notebook computer, a laptop computer, a server, server farm, blade server, or any other type of server, and so forth. In some embodiments, the device 101 may be a communication station, a mobile station, an advanced station, a client, a platform, a wireless communication device, a mobile computer, a set-top box, a handheld computer, a handheld device, a Personal Digital Assistant (PDA) device, a handheld PDA device, netbook, a mobile telephone, a smart phone, a mobile cellular telephone, and so forth. Embodiments are not limited in this manner.

In embodiments, the memory 105 may be one or more of random access memory (RAM), read-only memory (ROM), electrically erasable programmable read-only memory (EEPROM), flash memory, and so forth. The memory 105 is not limited to these memory components. For example, the memory 105 may include a non-transitory computer-readable storage medium.

As mentioned, the memory 105 may be divided into a number of regions 110-$m$, where m may be any positive integer. These regions 110-$m$ may be generated by one or more instructions, such as those implemented in firmware 125. For example, each region 110-$m$ may be configured with a particular size, at a specific location, and address range such that information stored in the each region 110-$m$ may be accessible to other components and processing circuitry of the device 101. In some embodiments, the firmware 125 may include one or more instructions that may be processed by the CPU 120 and, in particular, processing circuitry 124 during a booting sequence to generate the one or more regions 110-$m$ to include the information. Moreover, each region 110-$m$ may store information, such as code, data, page tables, descriptor tables, and so forth. In some embodiments, the information may be retrieved from storage 115 or another non-volatile storage device or memory device via one or more lookups in a page table, such as page table(s) 130 and inserted into a particular region 110-$m$ of memory 105.

Further and in some embodiments the regions 110-$m$ may be configured with one or more characteristics via hardware mechanisms which may be implemented or invoked by one or more instruction set architecture (ISA) operations. The one or more characteristics may include an immutable characteristic, a writeable characteristic, a read-only characteristic, an executable characteristic, an executable disabled characteristic, and so forth. These characteristics may provide a more secure operating environment for performing operations discussed herein. In some instances, one or more characteristics may be applied to each of the regions 110-m based on whether one or more bits are set or cleared (not set) in the one or more registers 122, such as a lock registers 122-1-n, by the ISA operations, for example. Embodiments are not limited in this manner and other mechanisms may be used to configure a region 110-m.

In embodiments, the device 101 may include storage 115. Storage 115 may be implemented as a non-volatile storage device such as, but not limited to, a disk drive, an internal storage device, an attached storage device, flash memory, battery backed-up SDRAM (synchronous DRAM), and/or a network accessible storage device. In embodiments, the storage 115 may store information which, at least part of, may be copied and/or moved to one or more of the regions 110-m of the memory 105. In some embodiments, the information may include code, data, tables, and so forth, and may be associated with a SMM of operation, for example. More specifically, the information may be SMM code, SMM data, SMI save state information, and page tables associated with the SMM of operation. Embodiments are not limited to this example.

In some embodiments, the device 101 may include one or more CPUs 120 which may include one or more cores to process information for the device 101. The CPU 120 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. In some embodiments, the CPU 120 may be connected to and communicate with the other elements of the computing system via an one or more interconnects, such as one or more buses, control lines, and data lines.

As previously mentioned, the CPU 120 may include a number of registers 122 including one or more lock registers 122-1-n, where n may be any positive integer. Note that FIG. 1 only illustrates the CPU 120 having lock registers 122-1. However, embodiments are not limited in this manner and the CPU 120 may include any number of different kinds of registers including data registers, address registers (stack pointers), status registers, floating-point registers, constant registers, vector registers, memory type range registers, instruction registers, memory buffer registers, memory data registers, memory address registers, and so forth.

In some embodiments, the lock registers 122-1-n may be model specific registers (MSRs) or control register which may have a number of locations to store bits and include a base/mask pair having one or more bits to specify characteristics for the regions 110-m. The locations or bits of a lock register 122-1-n may be written to via a WRMSR instruction and read from via a RDMSR instruction. In some instances a lock register 122-1-n may be written to during a boot sequence via the firmware 125 and processing circuitry 124 to set the one or more characteristics for a region 110-m, for example. More specifically, one or more bits may be set in a lock register 122-1-n to apply characteristics to an associated region 110-m including, but not limited to, setting the region 110-m as immutable, writeable, read-only, executable, and/or non-executable (execution disabled). In some embodiments, one or more of the lock registers 122-1-n may not be changed once the boot sequence completes to ensure each characteristic set remains unchanged during the operation of the device 101. In one example, each bit of a particular lock register 122-1-n may be used to set a single characteristic for an associated region 110-m. However, embodiments are not limited in this manner. For example, a single register 122-1-n may be used to configure more than one region 110-m of the memory 105. In another example, more than one lock register 122-1-n may be used to configure a single region 110-m.

The CPU 120 may also include processing circuitry 124 to process information and instructions for the device 101, one or more of which may be implemented in firmware 125. The processing circuitry 124 may be circuitry that carries out the instructions of a computer program by performing the basic arithmetic, logical, control and input/output (I/O) operations specified by the instructions. For example, the processing circuitry 124 can include an arithmetic logic unit (ALU) that performs arithmetic and logic operations. In some instances, the registers 122 may supply operands to the ALU and store the results of ALU operations. The processing circuitry 124 may also include a control unit that fetches instructions from memory and "executes" them by directing the coordinated operations of the ALU, registers 122 and other components. Embodiments are not limited in this manner and the above-description only provides a high-level overview of processing by the processing circuitry 124 for the CPU 120.

In embodiments, the device 101 may also include firmware 125 to provide instructions that may be processed by the processing circuitry 124 and configure various aspects of embodiments described herein. More specifically, the firmware 125 may be a set of instructions programmed or hardcoded into read-only memory that saves and holds information even when power is not being applied. The firmware 125 may at least partially be implemented as part of the system BIOS that is used to initiate the device 101 and various hardware components of the device 101, such as the CPU 120, the memory 105 and regions 110. In some instances, the initiating of the device may include configuring one or more regions 110-m in the memory 105, causing information to be stored in the one or more regions 110-m, and applying one or more characteristics to the one or more regions 110-m to create a more secure operating environment.

In one illustrative example with reference to the device 101 of FIG. 1, the firmware 125 may generate a system management RAM (SMRAM) in the memory 105 that may have one or more regions 110-m. A first region 110-1 within the SMRAM may be used to store critical information related to an SMM of operation. The critical information may include SMM code, page table(s) relating to SMM, SMMSEG information, and so forth, and the firmware 125 may insert the critical information into the region 110-1. The firmware 125 may cause characteristics to be applied to the region 110-1 via an ISA operation to set the region 110-1 as immutable and read-only, for example. The ISA operation may include setting one or more bits in a lock register 122-1-1 that is associated with the region 110-1. Embodiments are not limited in this manner and in some instances, a different ISA operation may be performed to set the one or more characteristics for the region 110-1, such as, but not limited to, issuing one or more instructions, utilizing a memory-mapped input/output (MMIO) register, utilizing I/O ports, and so forth.

In the same example, the firmware 125 may generate a second region 110-2 and cause other SMM related information to be inserted into the region 110-2. For example, the firmware 125 may insert SMM data, SMI save points, and other SMM information into the second region 110-2, which may have different characteristics than the first region 110-1. More specifically, the firmware 125 may cause different characteristics to be applied to the second region 110-2, such as write enabled and execution disabled. These characteristics may be applied via an ISA operation, e.g. setting one or more bits of lock register 122-1-2. Embodiments are not limited to this example. These and other details will become more apparent in the follow description.

Figure 2:
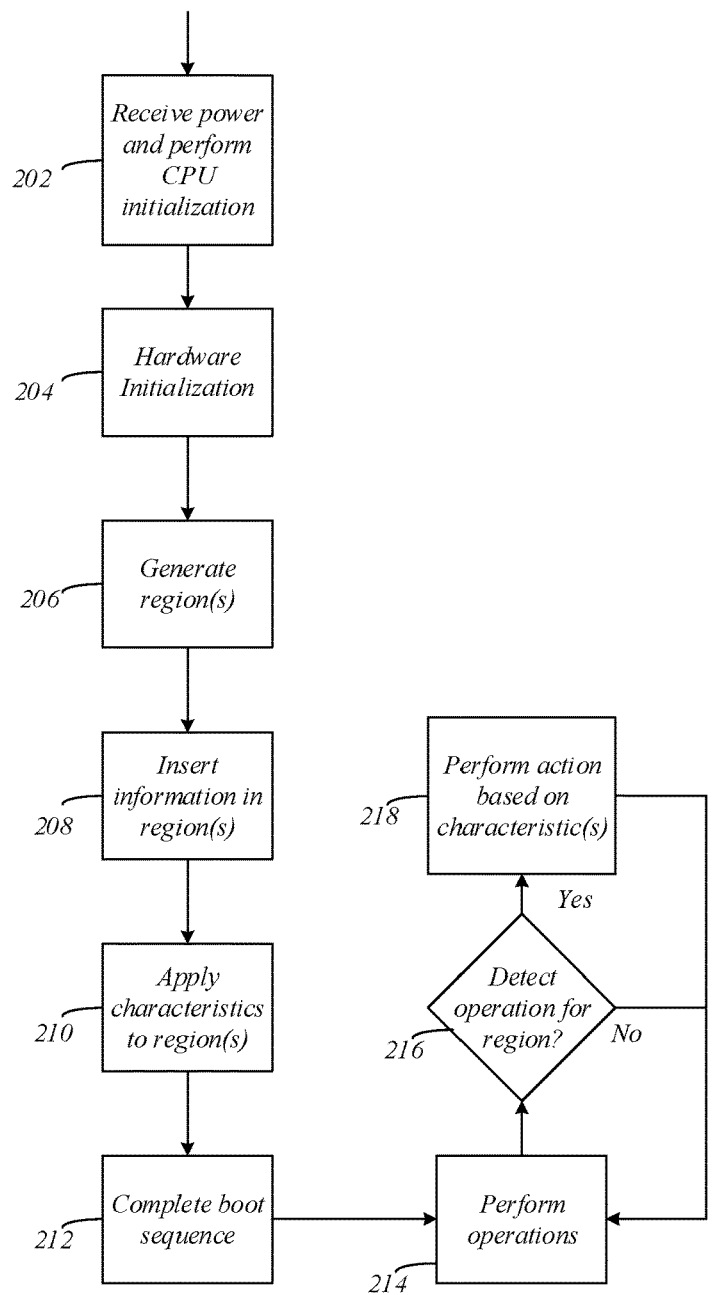
FIG. 2 illustrates an example of a first logic flow.

FIG. 2 illustrates one embodiment of a first logic flow 200. The logic flow 200 may be representative of some or all of the operations executed by one or more embodiments described herein. Further, the logic flow 200 may performed by circuitry and one or more components discussed herein, such as the processing circuitry 124. Moreover, logic flow 200 may be performed in conjunction with one or more other logic flows discussed herein and lists particular steps occurring in a particular order. However, embodiments are not limited in this manner.

The logic flow 200 may be one example flow to configure one or more regions 110-m in memory 105 with one or more characteristics. In embodiments, the logic flow 200 may include receiving power by the device 101 and performing a CPU 120 initialization for further processing. For example, a user or another device may cause the device 101 to receive power to turn on the device 101. For example, the CPU 120 initializes itself, which is triggered by a series of clock ticks generated by a system clock (not shown). Part of the CPU's 120 initialization is to look for firmware 125, e.g. the BIOS, for a first set of instructions in the startup program. As previously discussed, the firmware 125 may store the first instructions, which initialize and configure other hardware components, including controllers, memory, video cards and storage of the device 100 at block 204. More specifically, the first set of instructions in the firmware 125 may specify a POST operation stored in a predetermined memory address of memory 105, for example. The POST may initialize the CPU 120 by checking the inventoried hardware devices such as memory, a video card, secondary storage devices, such as hard drives and floppy drives, ports and other hardware devices, such as the keyboard and mouse, to ensure they are functioning properly.

As part of the initialization process and once the POST initializes and checks the hardware components including the memory 105, one or more regions 110-m may be generated in the memory 105 to store information at block 206. The instructions may cause the processing circuitry 124 to allocate a portion of the memory 105 having a specified size and within a particular address range for each region 110-m. In some embodiments, each region 110-m may include one or more memory locations which may or may not be contiguous within the address range.

At block 208, information may be inserted or copied into the generated regions 110-m. In some embodiments, the information may be copied from storage 115 to a particular region 110-m of memory 105. Moreover, to insert the information into a region 110-m of the memory 105, the firmware 125 may utilize a page table, such as page table(s) 130 to locate the information which may include one or more images stored in the storage 115. In some instances, the firmware 125 may obtain or cause the processing circuitry 124 to populate the information from one or more locations or storage 115 into one or more regions 110-m. The firmware 125 may employ one or more non-identity mapped page tables and identity mapped page tables, e.g. page tables 130. The page tables 130 may be employed and stored in non-volatile memory or storage for use in determining the location of the information populated in the regions 110-m. Moreover, the page tables 130 may include non-identity mapped page tables and identity mapped page tables having mappings for applications and operations to perform lookup operations and obtain physical contiguous information or code from multiple loadable images without physically interspersing the images related data. Embodiments are not limited in this manner.

In some embodiments, the firmware 125 may verify the information prior to inserting it into the regions 110-m of memory 105. For example, the firmware 125 may utilize a verification technique based on a boot property to ensure that the information is correct and does not include errors and/or malicious code. The verification technique may also include the utilization of one or more cryptographic and encryption techniques, such as the use of keys, hashes, and other encryption algorithms.

At block 210, embodiments may include applying one or more characteristics to the generated regions 110-m having the information. The one or more characteristics may include setting a particular region 110-m as one or more of immutable, writable, read-only, executable, non-executable (execution disabled), and so forth. Embodiments are not limited in this manner. These characteristics may be applied by performing an ISA operation such as setting one or more bits in a register 122, such as a lock register 122-1-n, or a different MSR. In some instances, each bit of a lock register 122-1-n may be used to set a characteristic for a particular region 110-m. Once the one or more characteristics are applied to the regions 110-m of memory 105, the regions 110-m may be "locked," down, e.g. the one or more characteristics may not be changed. In other words, a lock register 122-1-n may not be modified nor the characteristics associated with the region 110-m. Each lock register 122-1-n and region 110-m may be configured and locked in a similar manner to provide a secure space of memory having desired characteristics.

Note that by configuring and locking a specific region 110-m with specific characteristics, such as immutability, desirable security features may be extended beyond the information stored in the specific region 110-m. For example, in the case of protecting SMM, a region 110-m may have critical SMM information, as previously discussed. This critical information may include SMM code, SMM page tables, and so forth. Setting the region 110-m having the critical SMM information as immutable can extend or refine protections for the rest of memory while in SMM of operation, e.g. information stored in a different region 110-m or portion of the memory 105 accessible by the SMM page tables stored in the immutable region will be protected. This feature may enable making different information stored in a different region to have variable characteristics, such as making only a subset of the immutable region executable, making non-SMM memory inaccessible, disallowing write access to SMI save state regions, etc. Embodiments are not limited in this manner.

At block 212, the logic flow 200 may include completing the initialization and boot sequence. The boot sequence may also include other initialization steps and loading of the operating system such that a user may operate the device 101. Embodiments are not limited in this respect.

At block 214, the device 101 may be booted into an operational state and operate in accordance with one or more instructions or operations in a "normal" operational state. For example, the device 101 may process information and data for an operating system, one or more applications, and so forth. The operations may include performing and processing one or more instructions to process information and data. The device 101 may continue to operate in this manner until and instruction or operation is detected to perform on information stored in a region 110-*m* configured with one or more characteristics at decision block 216. For example, an SMI may be triggered to cause the device to enter the SMM including processing SMM code and SMM data, which may be in or more regions 110-*m* having characteristics set.

At block 218, embodiments may include performing one or more actions based on the instruction or operation and characteristics set for an associated with the region 110-*m* For example, processing circuitry 124 the one or more actions may include reading information from the region 110-*m*, writing information to the region 110-*m*, executing information from the region 110-*m*, preventing reading information from the region 110-*m*, preventing writing information to the region 110-*m*, preventing executing information from the region 110-*m*. In some embodiments, if the instruction or operation is not permissible due to the characteristics, the processing circuitry 124 may generate and/or return an error, cause a page fault, cause a hardware response such as ignoring write instructions, ignoring read instructions, returning invalid information based on an execute fetch, and so forth. In some instances, the hardware responses may include recording a violation in a status region (not shown), generating trap, interrupt, exception, and causing a halt or reset, etc. In one example, an instruction includes are write to write information to one or more locations in a region 110-*m*, if region 110-*m* write characteristic is disabled, the logic flow may cause one or more of above error actions to occur. Embodiments are not limited in this manner. Note that FIG. 2 illustrates logic flow 200 occurring in a specific order. However, in the same other embodiments one or more of the blocks may occur before, after, or at the same time as other blocks. In some embodiments, one or more of the blocks may not be performed.

Figure 3:
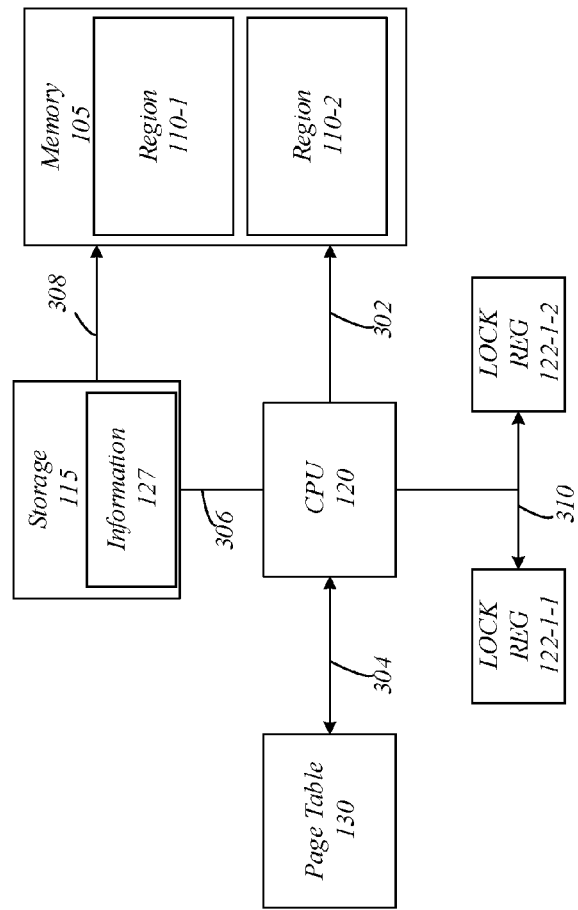
FIG. 3 illustrates an example of a first processing flow.

FIG. 3 illustrates example of a first processing flow 300 of a specific example of generating regions in memory to apply one or more characteristics. The processing flow 300 may include operations that may be performed by one or more components discussed herein. For example, the processing flow 300 may be based on information and instructions stored in firmware 125 and processed by processing circuitry 124 of the CPU 120, as illustrated in FIG. 3.

In the illustrated embodiment, the processing flow 300 may include generating two regions 110-1 and 110-2 in the memory 105, at line 302. Each of the regions 110-1 and 110-2 may have a particular size and are within a particular address range. The configuration of the regions 110-1 and 110-2 may be based on information stored in firmware 125, for example. Embodiments are not limited in this manner. For example, embodiments may include more or less regions 110-*m* in the memory 105.

At line 304, information to insert into each of the regions 110-1 and 110-2 may be determined based on a lookup in a page table 130, for example. Note that different information may be inserted into each of the regions 110-1 and 110-2. For example critical SMM information may be inserted into region 110-1 and other SMM related information may be inserted into region 110-2. The critical SMM information may include SMM code, page table(s) relating to SMM, SMMSEG information, and so forth and other SMM related information may include SMM data, SMI save points, and other SMM information. Embodiments are not limited in this manner and other data, code, tables, and so forth may be inserted into the regions 110-1 and 110-2.

At line 306, one or more instructions may be communicated with the storage 115 to locate information 127, which may include the critical SMM information and other SMM related information. The instructions may cause the storage 115 to locate the information 127 and moved and/or copied to be stored in the appropriate regions 110-1 and 110-2 at line 308. For example, information 127, such as the critical SMM information, may be copied from the storage 115 to the first region 110-1 via one or more write instructions or operations. Similarly and in another example, information 127, such as other SMM related information, may be copied from the storage to the second region 110-2 via one or more write instructions or operations. Embodiments are not limited to this specific example.

At line 310, one or more characteristics may be applied to the regions 110-1 and 110-2. In the illustrated example, lock register 122-1-1 may correspond with regions 110-1 and lock register 122-1-2 may correspond with region 110-2. Thus, in this example, one or more bits in lock register 122-1-1 may be set to configure one or more characteristics for region 110-1 and one or more bits in lock register 122-1-2 may be set to configure one or more characteristics for region 110-2. These one or more characteristics may include setting the regions 110-1 and 110-2 as immutable, executable, read-only, writeable, and so forth. Embodiments are not limited in this manner.

Figure 4:
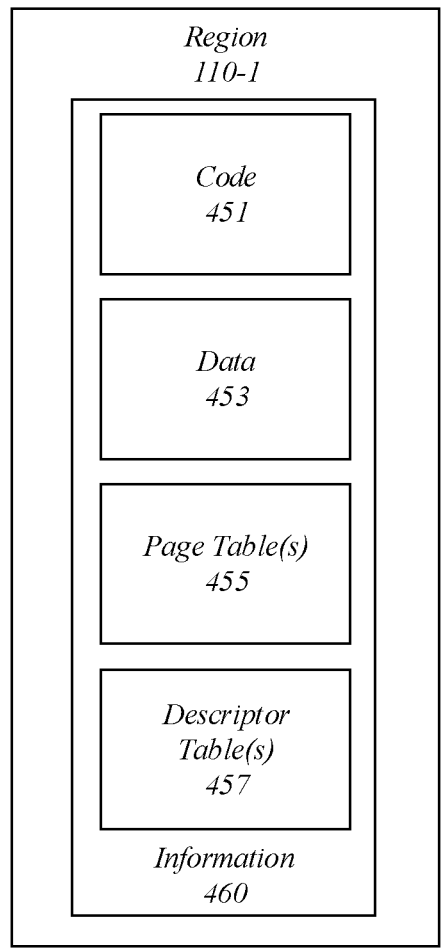
FIG. 4 illustrates an example of a region.

FIG. 4 illustrates an example of the region 110-1 having information 460. FIG. 4 illustrates one particular example of a region 110-1 and the same other embodiments may have a different configuration for a region 110-*m*. For example, other regions 110-*m* may have more or less information than the information 460 illustrated in FIG. 4. The information 460 illustrated in region 110 of FIG. 4 may include code 451, data 453, page table(s) 455, and descriptor table(s) 457.

The code 451 may be one or more instructions that may be performed by processing circuitry. The code 451 may include software elements including, but not limited, software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Embodiments are not limited in this manner. In one example, the code 451 may be SMM code or instructions that may be performed by the processing circuitry 124 to provide and conduct SMM related operations.

The data 453 may include any type of data or information. The data 453 may include information stored as variables, in data structures, and so forth. The data 453 may be the information to be processed by processing circuitry 124 and accordance with the code 451, for example. At its most rudimentary level the data 453 may be binary data. Embodiments are not limited in this manner. In one example, For example, the data 453 may be SMM data having information related to SMM of operation.

The page table(s) 455 may include pages having information to enable processing circuitry to perform a translation to translate a logical or virtual address to a physical address of memory or storage, for example. The descriptor table(s) 457 may include data structure to define the characteristics of the various memory areas used during program execution, including the base address, the size and access privileges like executability and writability. These memory areas may be called segments. The descriptor table(s) 457 may store other than segment descriptors including Task State Segment (or TSS) descriptors, Local Descriptor Table (LDT) descriptors, or Call Gate descriptors. The Call Gates descriptors, are particularly important for transferring control between privilege levels.

Figure 5:
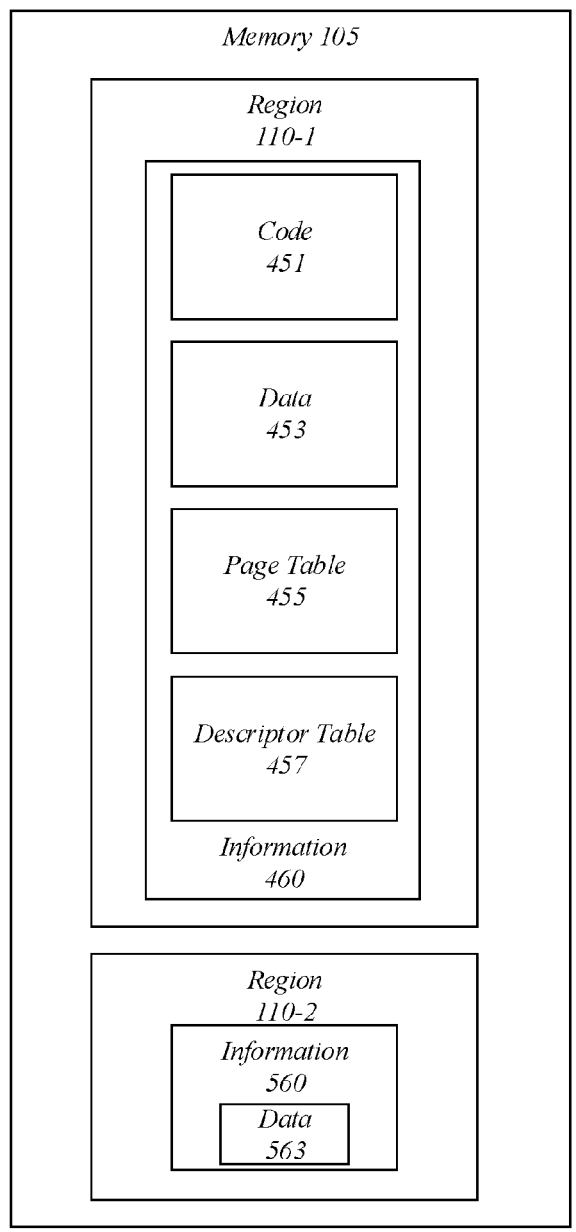
FIG. 5 illustrates an example of a memory.

FIG. 5 illustrates an example of a memory 105 having a first region 110-1 and a second region 110-2. The first region 110-1 may the same as region 110-1 discussed above in FIG. 3 and FIG. 4. For example, the first region 110-1 may include information 460 having code 451, data 453, page table(s) 455, and descriptor table(s) 457, as previously described.

The second region 110-2 may have information 560 having data 563. The data 563 may be different than data 453 previously discussed and located within the first region 110-1. Note that although not shown, the second region 110-2 may also include code, page tables and descriptor tables among other information.

In the illustrated embodiment, one or more characteristics may be applied to the first region 110-1 and the second region 110-2. In some instances, the one or more characteristics applied to first region 110-1 may be different than the one or more characteristics applied to second region 110-2. However, in other instances, the same characteristics may be applied to both the first and second regions 110-1 and 110-2.

In one example, the first region 110-1 may store critical SMM information which may include SMM code, page table(s) relating to SMM, SMMSEG information, and other critical structures. The first region 110-1 may be at the base of an existing system-management range register (SMRR) protected region. The second region 110-2 may include other SMM related information including SMM data, and SMI save points. Thus, the first region 110-1 may be set to have an immutable characteristic to prevent malicious code attacks and modification of the critical SMM information. While the second region 110-2 may be set with at least write characteristics to enable writing to the SMM data and SMI save states to the second region 110-2. Embodiments are not limited to these examples and different characteristics may be applied to different regions **110-*m*. For example, another region 110-*m*** may include data, software data, and set to have the characteristics of read-only (no writes), non-executable, and no page table accesses permitted. However, in a different example, a region may include characteristics of read-only, execution enabled, and page table accesses permitted.

Figure 6:
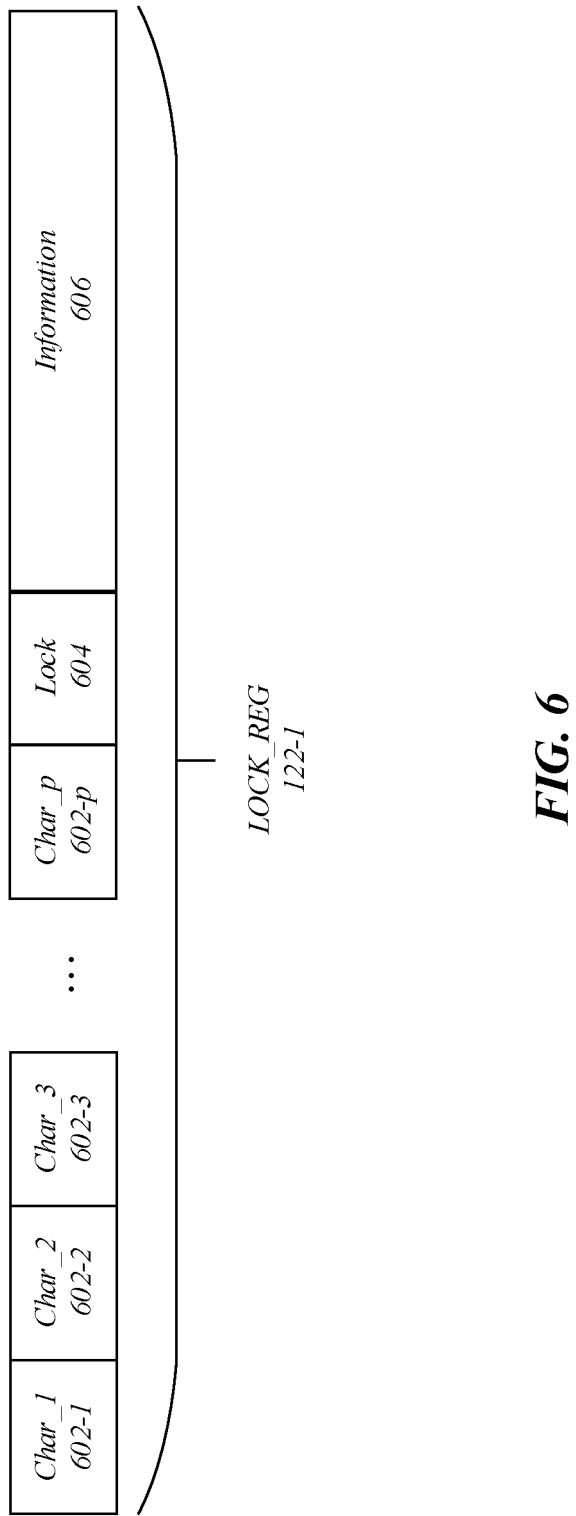
FIG. 6 illustrates an example of a register.

FIG. 6 illustrates an example of a lock register 122-1 which may be a MSR used to set one or more characteristics for one or more regions **110-*m* of a memory 105. As previously mentioned, each region 110-*m* may be associated with a particular lock register 122-1. Thus, setting one or more bits in the particular lock register 122-1-*n* will set one or more characteristics for the associated region 110-*m***. However, embodiments are not limited in this manner.

Each lock register 122-1 may include a number of characteristic bit locations **602-*p*, where p may be any positive integer. Further, each characteristic bit location 602 may control enabling and disabling one of the one or more characteristics, e.g. immutable characteristic, write characteristic, read characteristic, and execute characteristic. For example, a first bit location 602-1 may be used to control the immutable characteristic. Thus, when the first bit location 602-1 is set or includes a "1" value, an associated region 110-*m* may be immutable. Note that the opposite logic may be used and a bit location 602-*p* may be set with a "0" value. In a second example, a second bit location 602-2 may be used to control a characteristic. Thus, setting a bit in the second bit location 602-2 may make an associated region 110-*m* writable. In a third example, a third bit location 602-3 may be used to control an executable characteristic. Thus, setting a bit in the third bit location 602-3 may make an associated 110-*m* executable, or code stored with in the region 110-*m*** executable. Embodiments are not limited in this manner and to these examples.

In some embodiments, the lock register **122-1-*n* may include a lock bit 604 that may be used by the firmware, for example, to lock the lock register 122-1 from being modified, overwritten, and erased. In some embodiments, other hardware mechanisms may be used to lock the lock register 122-1, including the utilization of a "write once value" set in the lock register 122-1. Thus, the lock register 122-1 may only be written to once. In some embodiments, the lock register 122-1 may also include one or more other bit locations 606 that may be used to control other configurations for a particular or associated region 110-*m***.

FIG. 7 illustrates an example of a second processing flow 700 to generate a region 110 and set characteristics for the region 110. The processing flow 700 may be representative of some or all of the operations executed by one or more embodiments described herein. For example, the processing flow 700 may illustrate operations performed by device 101, and in particular, CPU 120 and processing circuitry 124.

At block 705, the logic flow 700 may include determining a region of the memory to store information. In some embodiments, determining the region may include allocating and/or generating a region in a memory based on information stored in firmware. Further, the region of memory may be determined during a boot sequence of based on one or more instruction of the firmware being processed by processing circuitry. In some instances, the size, address range, and location of the region may be based on the information and instructions in the firmware.

At block 710, the logic flow 700 may include insert the information into the region of the memory. For example, stored in non-volatile memory or storage may be copied or inserted into the region of memory based information and instructions stored in the firmware processed by processing circuitry. In some instances, the processing circuitry may need to perform one or more lookup operations in a page table to determine one or more locations for the information in the non-volatile memory or storage to copy to the region. Embodiments are not limited in this manner.

The logic flow 700 may also include applying one or more characteristics to the region of the memory via an instruction set architecture (ISA) operation, the one or more characteristics comprising an immutable characteristic to prevent modification of the information in the region of the memory. In some instances, the firmware may include one or more instructions to cause the processing circuitry to perform the ISA operation which may include setting one or more bits in a model specific register to set the one or more characteristics for the region. In the same other embodiments, one or more other characteristics may be set by performing the ISA operation. Embodiments are not limited in this manner.

Figure 8:
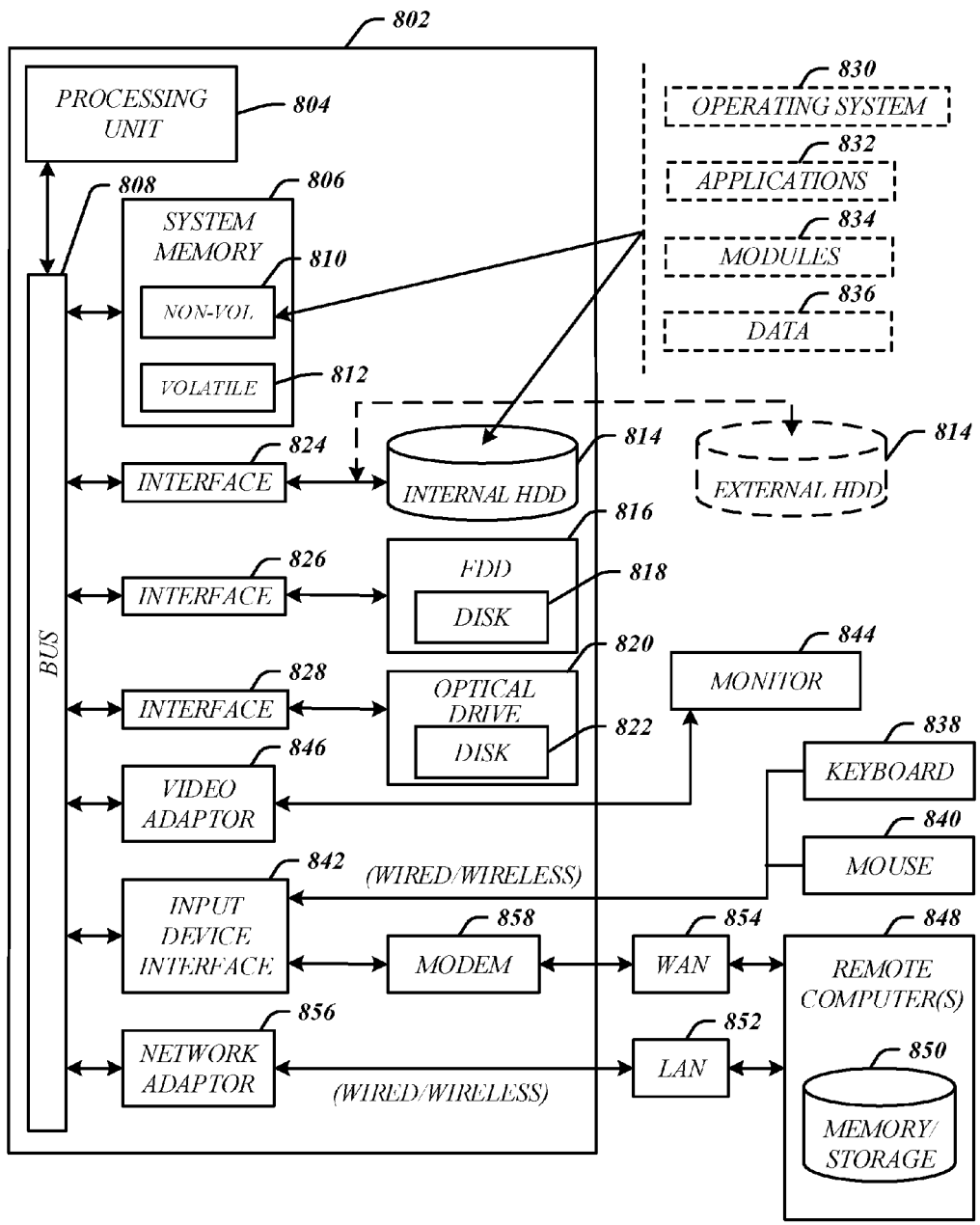
FIG. 8 illustrates an example embodiment of a first computing architecture.

FIG. 8 illustrates an embodiment of an exemplary computing architecture 800 suitable for implementing various embodiments as previously described. In one embodiment, the computing architecture 800 may include or be implemented as part of device 100 or 900.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes a processing unit 804, a system memory 806 and a system bus 808. The processing unit 804 can be any of various commercially available processors.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 700.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the device 100 and 800 as previously described with reference to FIGS. 1-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 9:
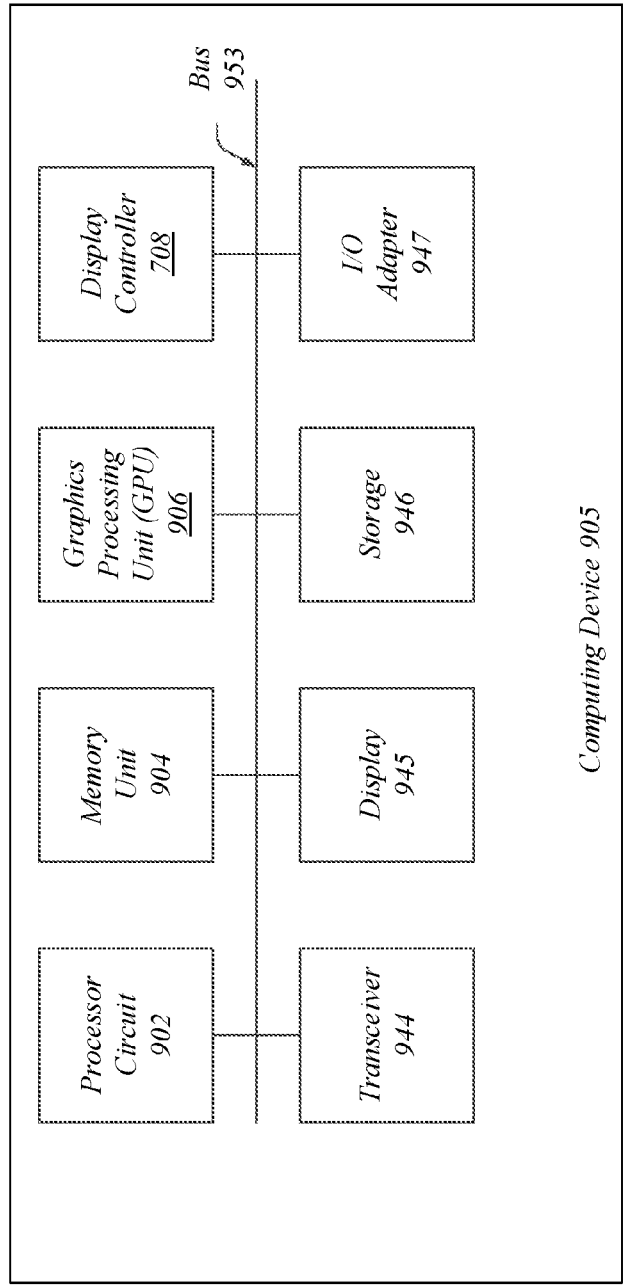
FIG. 9 illustrates an example embodiment of a device.

FIG. 9 illustrates one embodiment of a system 900. In various embodiments, system 900 may be representative of a system or architecture suitable for use with one or more embodiments described herein, such as device 100.

As shown in FIG. 9, system 900 may include multiple elements. One or more elements may be implemented using one or more circuits, components, registers, processors, software subroutines, modules, or any combination thereof, as desired for a given set of design or performance constraints. Although FIG. 9 shows a limited number of elements in a certain topology by way of example, it can be appreciated that more or less elements in any suitable topology may be used in system 900 as desired for a given implementation. The embodiments are not limited in this context.

In various embodiments, system 900 may include a computing device 905 which may be any type of computer or processing device including a personal computer, desktop computer, tablet computer, netbook computer, notebook computer, laptop computer, server, server farm, blade server, or any other type of server, and so forth.

Examples of a computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

In various embodiments, computing device 905 may include processor circuit 902. Processor circuit 902 may be implemented using any processor or logic device. The processing circuit 902 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 902 may be connected to and communicate with the other elements of the computing system via an interconnect 743, such as one or more buses, control lines, and data lines.

In one embodiment, computing device 905 may include a memory unit 904 to couple to processor circuit 902. Memory unit 904 may be coupled to processor circuit 902 via communications bus 743, or by a dedicated communications bus between processor circuit 902 and memory unit 904, as desired for a given implementation. Memory unit 04 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing device 905 may include a graphics processing unit (GPU) 906, in various embodiments. The GPU 906 may include any processing unit, logic or circuitry optimized to perform graphics-related operations as well as the video decoder engines and the frame correlation engines. The GPU 906 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 906 may process any type of graphics data such as pictures, videos, programs, animation, 3D, 2D, objects images and so forth.

In some embodiments, computing device 905 may include a display controller 908. Display controller 908 may be any type of processor, controller, circuit, logic, and so forth for processing graphics information and displaying the graphics information. The display controller 908 may receive or retrieve graphics information from one or more buffers, such as buffer(s) 220. After processing the information, the display controller 908 may send the graphics information to a display.

In various embodiments, system 900 may include a transceiver 944. Transceiver 944 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 944 may operate in accordance with one or more applicable standards in any version. The embodiments are not limited in this context.

In various embodiments, computing device 905 may include a display 945. Display 945 may constitute any display device capable of displaying information received from processor circuit 902, graphics processing unit 906 and display controller 908.

In various embodiments, computing device 905 may include storage 946. Storage 946 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 946 may include technology to increase the storage performance enhanced protection for valuable digital media when multiple hard drives are included, for example. Further examples of storage 946 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 905 may include one or more I/O adapters 947. Examples of I/O adapters 947 may include Universal Serial Bus (USB) ports/adapters, IEEE 1394 Firewire ports/adapters, and so forth. The embodiments are not limited in this context.

The detailed disclosure now turns to providing examples that pertain to further embodiments. Examples one through thirty-six (1-36) provided below are intended to be exemplary and non-limiting.

In a first example, a system, device, apparatus may include memory and logic, at least a portion of which is implemented in processing circuitry coupled to the memory. In some embodiments, the logic may determine a region of the memory in which to store information, insert the information into the region of the memory, and apply one or more characteristics to the region of the memory via an instruction set architecture (ISA) operation, the one or more characteristics comprising an immutable characteristic to prevent modification of the information in the region of the memory.

In a second example and in furtherance of the first example, a system, device, apparatus may include the logic to insert the information from one or more locations of storage or memory into the region of memory and utilize one or more non-identity mapped page tables and identity mapped page tables to enable lookup operations for the region.

In a third example and in furtherance of any previous example, a system, device, apparatus may include the information comprising at least one of data, code, one or more page tables, and one or more descriptor tables.

In a fourth example and in furtherance of any previous example, a system, device, apparatus may include the ISA operation comprising setting one or more bits of one or more model specific registers (MSRs) to apply the one or more characteristics.

In a fifth example and in furtherance of any previous example, a system, device, apparatus may include the logic to set a lock bit for each of the one or more MSRs to prevent each of the MSRs from being overwritten and erased.

In a sixth example and in furtherance of any previous example, a system, device, apparatus may include each of the one or more MSRs comprising a base/mask pair having one or more bits to specify the one or more characteristics for the region.

In a seventh example and in furtherance of any previous example, a system, device, apparatus may include the processing circuitry to perform one or more actions based on settings for each of the one or more characteristics, the one or more actions comprising reading information from the region, writing information to the region, executing information from the region, preventing reading information from the region, preventing writing information to the region, and preventing executing information from the region.

In an eighth example and in furtherance of any previous example, a system, device, apparatus may include the one or more characteristics comprising a read characteristic, a write characteristic and an execute characteristic, and the logic to perform the one or more actions on information in the region based on each of the one or more characteristics being enabled or disabled.

In a ninth example and in furtherance of any previous example, a system, device, apparatus may include determine a second region of the memory for which to store second information, the second region different than the first region and second information different than the information, insert the second information into the second region of the memory, and apply one or more other characteristics to the region of the memory via the ISA operation, the one or more other characteristics comprising a read characteristic, a write characteristic and an execute characteristic.

In a tenth example and in furtherance of any previous example, a non-transitory computer-readable storage medium comprising a plurality of instructions that when executed enable processing circuitry to determine a region of the memory for which to store information, insert the information into the region of the memory, and apply one or more characteristics to the region of the memory via an instruction set architecture (ISA) operation, the one or more characteristics comprising an immutable characteristic to prevent modification of the information in the region of the memory.

In an eleventh example and in furtherance of any previous example, a non-transitory computer-readable storage medium comprising a plurality of instructions that when executed enable processing circuitry to insert the information from one or more locations of storage or memory into the region of memory and utilize one or more non-identity mapped page tables and identity mapped page tables to enable lookup operations.

In a twelfth example and in furtherance of any previous example, a non-transitory computer-readable storage medium comprising the information comprising at least one of data, code, one or more page tables, and one or more descriptor tables.

In a thirteenth example and in furtherance of any previous example, a non-transitory computer-readable storage medium comprising the ISA operation comprising setting one or more bits of one or more model specific registers (MSRs) to apply the one or more characteristics.

In a fourteenth example and in furtherance of any previous example, a non-transitory computer-readable storage medium comprising a plurality of instructions that when executed enable processing circuitry to set a lock bit for each of the one or more MSRs to prevent each of the MSRs from being overwritten and erased.

In a fifteenth example and in furtherance of any previous example, a non-transitory computer-readable storage medium comprising each of the one or more MSRs comprising a base/mask pair having one or more bits to specify the one or more characteristics for the region.

In a sixteenth example and in furtherance of any previous example, a non-transitory computer-readable storage medium comprising a plurality of instructions that when executed enable processing circuitry to perform one or more actions based on settings for each of the one or more characteristics, the one or more actions comprising reading information from the region, writing information to the region, executing information from the region, preventing reading information from the region, preventing writing information to the region, preventing executing information from the region.

In a seventeenth example and in furtherance of any previous example, a non-transitory computer-readable storage medium comprising the one or more characteristics comprising a read characteristic, a write characteristic and execute characteristic, and the plurality of instructions comprising instructions that when executed enable the processing circuitry to perform the one or more actions on information in the region based on each of the one or more characteristics being enabled or disabled.

In an eighteenth example and in furtherance of any previous example, a non-transitory computer-readable storage medium comprising a plurality of instructions that when executed enable processing circuitry to determine a second region of the memory for which to store second information, the second region different than the first region and second information different than the information, insert the second information into the second region of the memory, and apply one or more characteristics to the region of the memory via an instruction set architecture (ISA) operation, the one or more characteristics comprising an immutable characteristic to prevent modification of the information in the region of the memory.

In a nineteenth example and in furtherance of any previous example, a computer-implemented method may include determining a region of the memory for which to store information, inserting the information into the region of the memory, and applying one or more characteristics to the region of the memory via an instruction set architecture (ISA) operation, the one or more characteristics comprising an immutable characteristic to prevent modification of the information in the region of the memory.

In a twentieth example and in furtherance of any previous example, a computer-implemented method may include inserting the information from one or more locations of storage or memory into the region of memory and utilizing one or more non-identity mapped page tables and identity mapped page tables to enable lookup operations.

In a twenty-first example and in furtherance of any previous example, a computer-implemented method may include setting one or more bits of one or more model specific registers (MSRs) to apply one or more characteristics including the immutable characteristic to perform the ISA operation.

In a twenty-second example and in furtherance of any previous example, a computer-implemented method may include setting a lock bit for each of the one or more MSRs to prevent each of the MSRs from being overwritten and erased.

In a twenty-third example and in furtherance of any previous example, a computer-implemented method may include each of the one or more MSRs comprising a base/mask pair having one or more bits to specify the one or more characteristics for the region.

In a twenty-fourth example and in furtherance of any previous example, a computer-implemented method may include performing one or more actions based on settings for each of the one or more characteristics, the one or more actions comprising reading information from the region, writing information to the region, executing information from the region, preventing reading information from the region, preventing writing information to the region, and preventing executing information from the region.

In a twenty-fifth example and in furtherance of any previous example, a computer-implemented method may include performing the one or more actions on information in the region based on each of the one or more characteristics being enabled or disabled, the one or more characteristics comprising a read characteristic, a write characteristic and an execute characteristic.

In a twenty-sixth example and in furtherance of any previous example, a computer-implemented method may include the information comprising at least one of data, code, one or more page tables, and one or more descriptor tables.

In a twenty-seventh example and in furtherance of any previous example, a computer-implemented method may include determining a second region of the memory for which to store second information, the second region different than the first region and second information different than the information, inserting the second information into the second region of the memory; and applying one or more other characteristics to the region of the memory via the ISA operation, the one or more other characteristics comprising a read characteristic, a write characteristic and an execute characteristic.

In an twenty-eighth example and in furtherance of any previous example, an apparatus may include means for determining a region of the memory for which to store information, means inserting the information into the region of the memory, and means for applying one or more characteristics to the region of the memory via an instruction set architecture (ISA) operation, the one or more characteristics comprising an immutable characteristic to prevent modification of the information in the region of the memory.

In a twenty-ninth example and in furtherance of any previous example, an apparatus may include means for inserting the information from one or more locations of storage or memory into the region of memory and utilize one or more non-identity mapped page tables and identity mapped page tables to enable lookup operations.

In a thirtieth example and in furtherance of any previous example, an apparatus may include the information comprising at least one of data, code, one or more page tables, and one or more descriptor tables.

In a thirty-first example and in furtherance of any previous example, an apparatus may include comprising means for setting one or more bits of one or more model specific registers (MSRs) to apply the one or more characteristics.

In a thirty-second example and in furtherance of any previous example, an apparatus may include comprising means for setting a lock bit for each of the one or more MSRs to prevent each of the MSRs from being overwritten and erased.

In a thirty-third example and in furtherance of any previous example, an apparatus may include each of the one or more MSRs comprising a base/mask pair having one or more bits to specify the one or more characteristics for the region.

In a thirty-fourth example and in furtherance of any previous example, an apparatus may include comprising means for performing one or more actions based on settings for each of the one or more characteristics, the one or more actions comprising reading information from the region, writing information to the region, executing information from the region, preventing reading information from the region, preventing writing information to the region, preventing executing information from the region.

In a thirty-fifth example and in furtherance of any previous example, an apparatus may include the one or more characteristics comprising a read characteristic, a write characteristic and execute characteristic, and the apparatus comprising means for performing the one or more actions on information in the region based on each of the one or more characteristics being enabled or disabled.

In a thirty-sixth example and in furtherance of any previous example, an apparatus may include means for determining a second region of the memory for which to store second information, the second region different than the first region and second information different than the information, means for inserting the second information into the second region of the memory, and means for applying one or more characteristics to the region of the memory via an instruction set architecture (ISA) operation, the one or more characteristics comprising an immutable characteristic to prevent modification of the information in the region of the memory.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   memory; and
   logic, at least a portion of which is implemented in processing circuitry coupled to the memory, the logic to:
   determine first and second regions of the memory in which to store first and second portions of system management mode (SMM) information, the first portion of SMM information comprising SMM code and the second portion of SMM information comprising SMM data;
insert the SMM code into the first region of the memory and the SMM data into the second region of the memory; and
apply a first set of one or more characteristics to the first region of the memory via a first instruction set architecture (ISA) operation and a second set of one or more characteristics to the second region of memory via a second ISA operation, the first set of one or more characteristics comprising an immutable characteristic to prevent modification of the SMM code in the first region of the memory and a no page table accesses permitted characteristic and the second set of one or more characteristic comprising a page table accesses permitted characteristic.

2. The apparatus of claim 1, the logic to insert the first portion of SMM information from one or more locations of storage or memory into the first region of the memory and utilize one or more non-identity mapped page tables and identity mapped page tables to enable lookup operations for the first region.

3. The apparatus of claim 1, the ISA operation comprising setting one or more bits of one or more model specific registers (MSRs) to apply the first and second sets of one or more characteristics.

4. The apparatus of claim 3, the logic to set a lock bit for each of the one or more MSRs to prevent each of the MSRs from being overwritten and erased.

5. The apparatus of claim 3, each of the one or more MSRs comprising a base/mask pair having one or more bits to specify the first set of one or more characteristics for the first region.

6. The apparatus of claim 1, comprising the processing circuitry to perform one or more actions based settings for each of the first set of one or more characteristics, the one or more actions comprising reading information from the first region, writing information to the first region, executing information from the first region, preventing reading information from the first region, preventing writing information to the first region, and preventing executing information from the first region.

7. The apparatus of claim 6, the first set of one or more characteristics comprising a read characteristic, a write characteristic and an execute characteristic, and the logic to perform the one or more actions on information in the first region based on each of the first set of one or more characteristics being enabled or disabled via one or more registers.

8. The apparatus of claim 1, the logic to:
apply one or more other characteristics to the second region of the memory via the second ISA operation, the one or more other characteristics comprising at least one characteristic enabled in the second set of one or more characteristics that is disabled in the first set of one or more characteristics.

9. The apparatus of claim 1, the logic to verify the SMM code based on a boot property prior to insertion of the SMM code into the first region of the memory.

10. A non-transitory computer-readable storage medium comprising a plurality of instructions that when executed enable processing circuitry to:
determine first and second regions of a memory for which to store first and second portions of system management mode (SMM) information, the first portion of SMM information comprising SMM code and the second portion of SMM information comprising SMM data;
insert the SMM code into the first region of the memory and the SMM data into the second region of the memory; and
apply a first set of one or more characteristics to the first region of the memory via a first instruction set architecture (ISA) operation and a second set of one or more characteristics to the second region of memory via a second ISA operation, the first set of one or more characteristics comprising an immutable characteristic to prevent modification of the SMM code in the first region of the memory and a no page table accesses permitted characteristic and the second set of one or more characteristic comprising a page table accesses permitted characteristic.

11. The non-transitory computer-readable storage medium of claim 10, the plurality of instructions comprising instructions that when executed enable the processing circuitry to insert the first portion of SMM information from one or more locations of storage or memory into the first region of the memory and utilize one or more non-identity mapped page tables and identity mapped page tables to enable lookup operations.

12. The non-transitory computer-readable storage medium of claim 10, the ISA operation comprising setting one or more bits of one or more model specific registers (MSRs) to apply the first and second sets of one or more characteristics.

13. The non-transitory computer-readable storage medium of claim 12, the plurality of instructions comprising instructions that when executed enable the processing circuitry to set a lock bit for each of the one or more MSRs to prevent each of the MSRs from being overwritten and erased.

14. The non-transitory computer-readable storage medium of claim 12, each of the one or more MSRs comprising a base/mask pair having one or more bits to specify the first set of one or more characteristics for the first region.

15. The non-transitory computer-readable storage medium of claim 10, the plurality of instructions comprising instructions that when executed enable the processing circuitry to perform one or more actions based on settings for each of the first set of one or more characteristics, the one or more actions comprising reading information from the first region, writing information to the first region, executing information from the first region, preventing reading information from the first region, preventing writing information to the first region, preventing executing information from the first region.

16. The non-transitory computer-readable storage medium of claim 15, the first set of one or more characteristics comprising a read characteristic, a write characteristic and execute characteristic, and the plurality of instructions comprising instructions that when executed enable the processing circuitry to perform the one or more actions on the SMM code in the first region based on each of the first set of one or more characteristics being enabled or disabled via one or more registers.

17. The non-transitory computer-readable storage medium of claim 10, the plurality of instructions comprising instructions that when executed enable the processing circuitry to:
apply one or more characteristics to the second region of the memory via the second ISA operation, the one or more characteristics comprising at least one characteristic enabled in the second set of one or more characteristics that is disabled in the first set of one or more characteristics.

18. A computer-implemented method, comprising:
determining first and second regions of a memory for which to store first and second portions of system management mode (SMM) information, the first portion of SMM information comprising SMM code and the second portion of SMM information comprising SMM data;
inserting the SMM code into the first region of the memory and the SMM data into the second region of the memory;
applying a first set of one or more characteristics to the first region of the memory via a first instruction set architecture (ISA) operation and a second set of one or more characteristics to the second region of memory via a second ISA operation, the first set of one or more characteristics comprising an immutable characteristic to prevent modification of the SMM code in the first region of the memory and a no page table accesses permitted characteristic and the second set of one or more characteristic comprising a page table accesses permitted characteristic.

19. The computer-implemented method of claim 18, comprising inserting the first portion of SMM information from one or more locations of storage or memory into the first region of the memory and utilizing one or more non-identity mapped page tables and identity mapped page tables to enable lookup operations.

20. The computer-implemented method of claim 18, comprising setting one or more bits of one or more model specific registers (MSRs) to apply the first and second sets of one or more characteristics including the immutable characteristic to perform the ISA operation.

21. The computer-implemented method of claim 20, comprising setting a lock bit for each of the one or more MSRs to prevent each of the MSRs from being overwritten and erased.

22. The computer-implemented method of claim 20, each of the one or more MSRs comprising a base/mask pair having one or more bits to specify the first set of one or more characteristics for the first region.

23. The computer-implemented method of claim 18, comprising performing one or more actions based on settings for each of the first set of one or more characteristics, the one or more actions comprising reading information from the first region, writing information to the first region, executing information from the first region, preventing reading information from the first region, preventing writing information to the first region, and preventing executing information from the first region.

24. The computer-implemented method of claim 23, performing the one or more actions on the SMM code in the first region based on each of the first set of one or more characteristics being enabled or disabled via one or more registers.

25. The computer-implemented method of claim 18, comprising verifying the SMM code based on a boot property prior to insertion of the SMM code into the first region of the memory.

* * * * *